United States Patent
Yamada et al.

(10) Patent No.: US 8,040,771 B2
(45) Date of Patent: Oct. 18, 2011

(54) OPTICAL DISC APPARATUS AND METHOD FOR CONTROLLING OVERWRITE POWER

(75) Inventors: Atsushi Yamada, Saitama (JP); Toru Kawashima, Mito (JP); Tomoya Hoshi, Fujisawa (JP); Mitsuhiro Nishidate, Sagamihara (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 364 days.

(21) Appl. No.: 12/334,631

(22) Filed: Dec. 15, 2008

(65) Prior Publication Data

US 2009/0161506 A1 Jun. 25, 2009

(30) Foreign Application Priority Data

Dec. 20, 2007 (JP) ................................. 2007-328410

(51) Int. Cl.
*G11B 7/00* (2006.01)

(52) U.S. Cl. ................ 369/47.53; 369/59.11; 369/47.52

(58) Field of Classification Search ........................ None
See application file for complete search history.

(56) References Cited

U.S. PATENT DOCUMENTS

| | | | | |
|---|---|---|---|---|
| 4,939,717 | A * | 7/1990 | Ohno et al. ................... | 369/116 |
| 6,285,647 | B1 * | 9/2001 | Van Woudenberg et al. . | 369/116 |
| 7,079,466 | B1 * | 7/2006 | Jacobs ........................ | 369/59.12 |
| 2002/0110066 | A1 * | 8/2002 | Mashimo et al. ........... | 369/47.53 |
| 2004/0125729 | A1 * | 7/2004 | Seo .............................. | 369/59.11 |
| 2005/0013229 | A1 * | 1/2005 | Yokoi ........................ | 369/59.12 |
| 2005/0041548 | A1 * | 2/2005 | Masui ........................ | 369/47.53 |
| 2005/0073935 | A1 * | 4/2005 | Miura et al. .................... | 369/94 |
| 2005/0073940 | A1 * | 4/2005 | Miura et al. ................ | 369/275.2 |
| 2009/0161506 | A1 * | 6/2009 | Yamada et al. .............. | 369/47.5 |

FOREIGN PATENT DOCUMENTS

JP 2005-196890 7/2005

* cited by examiner

*Primary Examiner* — Peter Vincent Agustin
(74) *Attorney, Agent, or Firm* — Antonelli, Terry, Stout & Kraus, LLP.

(57) ABSTRACT

An optical disc apparatus capable of improving an overwrite performance for performing an overwrite operation on a re-writable type optical disc. The apparatus includes a calculating section which calculates out a recording power at the time of previously performing recording in a recording area of the optical disc, and a recording power determining section which determines a write power of the recording power calculated out by the calculating section as a write power of the currently recorded recording power, and at the same time, adjusts erase power, cooling power, and/or middle power of the recording power calculated out by the calculating section to finally determine the currently recorded recording power.

16 Claims, 6 Drawing Sheets

OPTICAL DISC APPARATUS AND METHOD FOR CONTROLLING OVERWRITE POWER

INCORPORATION BY REFERENCE

The present application claims priority from Japanese application JP2007-328410 filed on Dec. 20, 2007, the entire content of which is hereby incorporated by reference into this application.

BACKGROUND OF THE INVENTION

The present invention relates to an optical disc apparatus and a method for controlling an overwrite power which can be suitably applied to the optical disc apparatus capable of performing an overwrite operation, for example, on a re-writable type optical disc.

A conventional optical disc apparatus has a problem that when performing an overwrite operation on a previously recorded recording area, a recording quality at the time of currently performing recording is largely different depending on a previously recorded recording state.

In the case where a recording power at the time of being previously recorded is particularly large, when performing an overwrite operation using the recording power that is adjusted by an optimum power control (OPC), possibility of a recording error such as Jitter error (PI error) increases to incur deterioration of recording quality in many cases. A so called retry process or alternation process is forced to be performed and as a result, a transfer rate of data tends to be undesirably lowered.

To solve the above-described problem, for example, according to Japanese Unexamined Patent Application Publication No. 2005-196890, an information recording device is provided with a recording means for recording information on a recording area in the information recording medium by irradiation with laser light, a reference output value holding means for holding the reference output value of the laser light for recording the information, an inference means for inferring the output value of the laser light in the past irradiation in the already recorded area in which the information is already recorded, and a control means for controlling the recording means to perform irradiation on the already recorded area with the laser light having an output value larger than the reference output value, when the inferred output value is larger than the reference output value.

SUMMARY OF THE INVENTION

However, an optical disc apparatus has the following problem. That is, when a recording power at the time of being previously recorded is large, even if the already recorded area is irradiated with laser light having an output value larger than a reference output value, recording errors occur on some level. As a result, deterioration in recording quality is incurred. Simultaneously, the area is repeatedly irradiated with laser light having an output value larger than the reference output value, thereby deteriorating a recording film of an optical disc.

In view of the foregoing, it is an object of the present invention to provide an optical disc apparatus and method for controlling an overwrite power which improve an overwrite performance.

To accomplish the above-described object, according to the present invention, there is provided an optical disc apparatus which performs an overwrite operation on a re-writable type optical disc. The optical disc apparatus comprises:

a calculating section which calculates out a recording power at the time of previously performing recording in a recording area of the optical disc; and a recording power determining section which determines a write power of the recording power calculated out by the calculating section as a write power of the currently recorded recording power, and at the same time, adjusts erase power, cooling power, and/or middle power of the recording power calculated out by the calculating section to finally determine the currently recorded recording power.

To accomplish another object, according to the present invention, there is also provided a method of controlling an overwrite power of an optical disc apparatus which performs an overwrite operation on a re-writable type optical disc. The method comprises:

a first step for calculating a recording power at the time of being previously recorded in a recording area of the optical disc; and a first step for calculating out a recording power at the time of previously performing recording in a recording area of the optical disc; and a second step for determining a write power of the recording power calculated out in the first step as a write power of the currently recorded recording power, and at the same time, for adjusting erase power, cooling power, and/or middle power of the recording power calculated out in the first step to finally determine the currently recorded recording power.

Accordingly, even when the previously outputted recording power is large, the microcomputer can reduce the recording error without increasing the Write power of the recording power. Simultaneously, the microcomputer can effectively prevent the recording film of the optical disc from deteriorating due to the output of laser beam with the larger recording power.

According to the present invention, there can be realized an optical disc apparatus and method for controlling an overwrite power which improve an overwrite performance.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF EMBODIMENTS

Hereinafter, an embodiment of the present invention will be described in detail with reference to the accompanying drawings.

Figure 1:
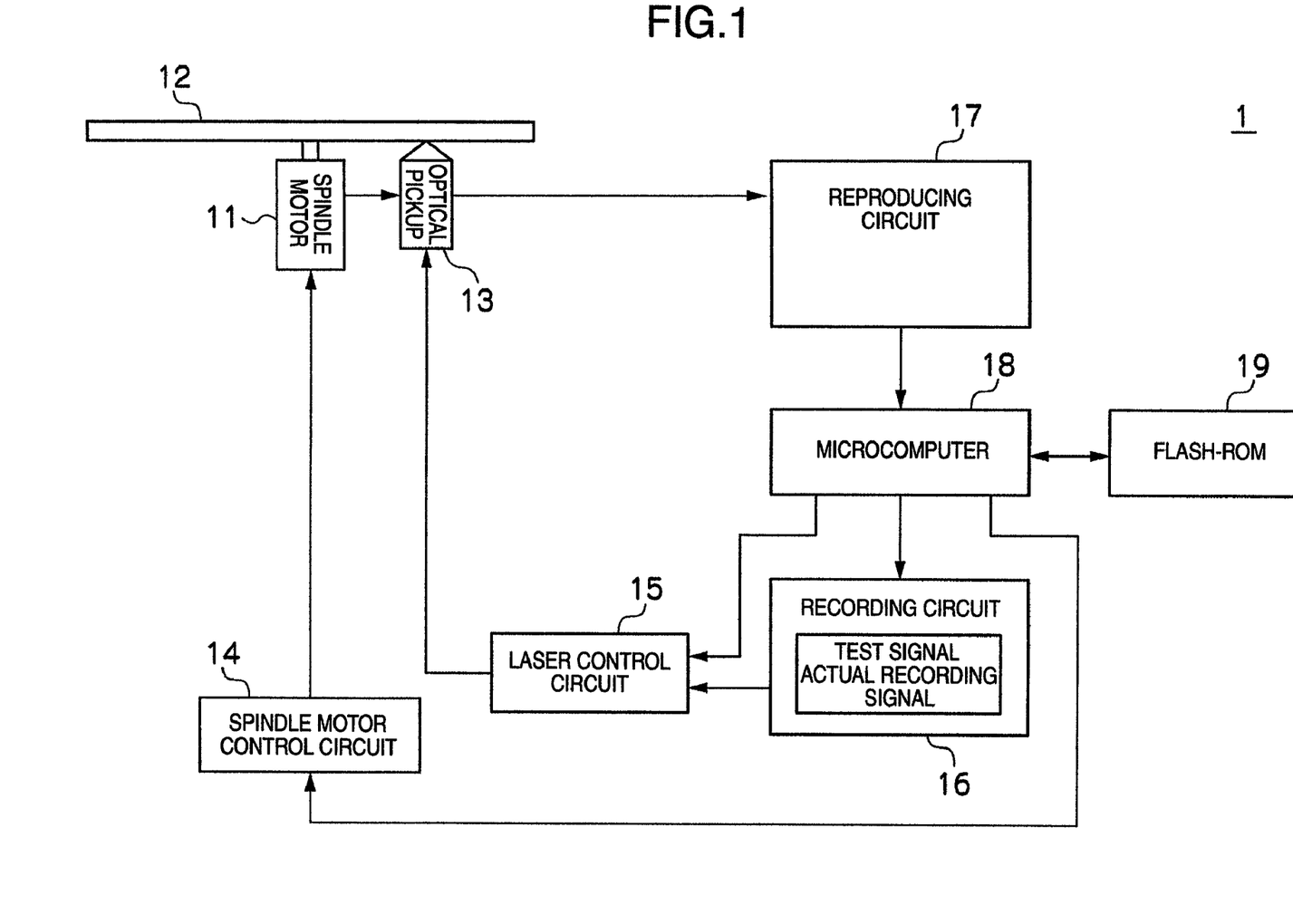
FIG. 1 is a block diagram illustrating a schematic structure of an optical disc apparatus according to an embodiment of the present invention.

FIG. 1 illustrates one example of the entire structure of an optical disc apparatus 1 according to the present embodiment of the invention. The optical disc apparatus 1 comprises a spindle motor 11, an optical disc 12, an optical pickup 13, a spindle motor control circuit 14, a laser control circuit 15, a recording circuit 16, a reproducing circuit 17, a microcomputer (MPU: Micro Processing Unit) 18, and a Flash-ROM 19.

In this optical disc apparatus 1, at a tip of rotation shaft of the spindle motor 11 is mounted an optical disc 12, being a detachable disc-shaped information recording medium by means of a holding member such as a turntable, but not shown in the figure, thereby being rotationally driven at a predetermined rotation speed.

On the other hand, in the optical disc apparatus 1, facing to the information recording surface (i.e., the lower surface in the figure) of the optical disc 12, which is rotationally driven at the predetermined rotation speed in this manner, the optical pickup 13 is provided in a movable manner into the radial direction of the optical disc 12, and therefore, although not shown in the figure, the optical pickup 13 irradiates a laser beam emitted from a light source, such as, a semiconductor laser, which is provided in an inside thereof, upon the information recording surface of the optical disc 12 through an optic system, including an objective lens therein, and further it receives a reflection light thereof, thereby conducting so-called a focusing operation and/or a tracking operation, as well as, recording or reproducing a test signal and/or an actual recording signal.

The spindle motor control circuit 14 is a so called driver circuit for use of controlling the spindle motor, for supplying driving current to the spindle motor 11. In this embodiment, it enables controlling, for example, a quad-speed (4x) and a six-speed (6x). The laser control circuit 15 is a driver circuit for use of controlling the laser, for supplying driving current to the semiconductor laser, which builds up the light source of the optical pickup 13. Further, into this laser control circuit 15 are provided or inputted a control signal from the microcomputer 18, which will be mentioned below, and also a recording control signal from the recording circuit 16.

The recording circuit 16 processes the test signal and/or the actual recording signal produced from an outside (though not shown in the figure, e.g., from a host computer, etc.), thereby controlling the recording thereof. On the other hand, a reproducing signal, which is detected and outputted by the optical pickup 13, is conducted with a predetermined process within the reproducing circuit 17, and thereby being reproduced into a generated signal (e.g., digital data), to be outputted into a host computer, for example.

The microcomputer 18 is provided as a control unit for controlling the optical disc apparatus 1, which comprises the above-described structures, and receives various kinds of signals through the reproducing circuit 17, and based on the signals, supplies control signals to the spindle motor control circuit 14, and further the recording circuit 16, in addition to the laser control circuit 15. Also, this microcomputer 18 is equipped with the Flash-ROM 19 to be a memory device thereof.

As described above, the optical disc apparatus 1 comprises the above-described structures, thereby realizing predetermined operations including recording of information and reproducing operation.

For example, the microcomputer 18 starts test writing operation, upon a start instruction of recording supplied from the host computer. In this case, the microcomputer 18 transmits this instruction to the spindle motor control circuit 14, and this spindle motor control circuit 14 rotates the spindle motor 11, thereby rotating the optical disc 12 at a predetermined speed. Also, in this instance, the microcomputer 18 gives such an instruction to the laser control circuit 15, that it transmits a test signal to the optical pickup 13, while controlling intensity of an output of the laser beam emitted from the semiconductor laser for the optical pickup 13, and thereby conducting the recording or reproducing onto a test writing area on the optical disc 12 (OPC process).

Thereafter, the microcomputer 18 calculates out an optimal recording power, and transmits the calculated value to the laser control circuit 15. Next, the microcomputer 18 gives an instruction to the laser control circuit 15, and at the same time, it transmits an actual recording signal to the optical pickup 13. With doing this, the optical pickup 13 enables to perform the overwrite operation with the optimal recording power, which is calculated out.

Figure 2:
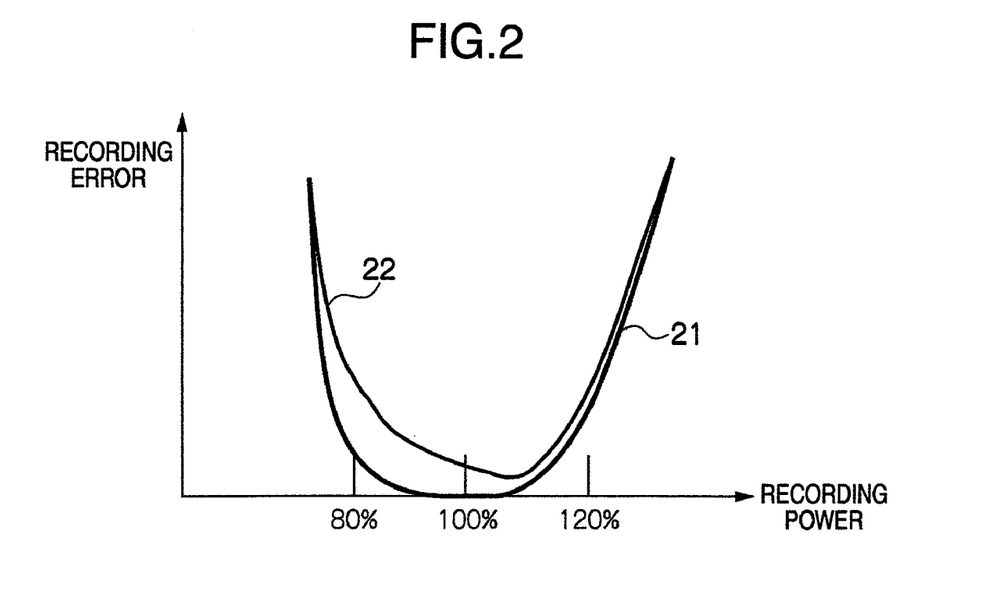
FIG. 2 is a conceptual diagram illustrating one example of a relationship between currently outputted recording power and a recording error.

FIG. 2 illustrates one example of a relationship between a currently outputted recording power and a recording error. The horizontal axis represents the recording power that is currently outputted at the time when performing the overwrite operation onto the previously recorded recording area. The vertical axis represents the frequency of the recording error. The recording power 100% of the horizontal axis means that the recording power is currently outputted with the optimum recording power calculated out by the OPC process. Further, the recording power 110% of the horizontal axis means that the recording power is currently outputted with the output power larger by 10% than the optimum recording power calculated out by the OPC process.

A first graph 21 shows a case where the recording power at the time of being previously recorded in the recording area is properly outputted (e.g., the recording power is equal to 100%). The first graph 21 shows that when the currently outputted recording power is equal to 100%, the recording error hardly occurs.

A second graph 22 shows a case where the recording power at the time of being previously recorded in the recording area is high outputted (e.g., the recording power is equal to 110%). The second graph 22 shows that when the currently outputted recording power is equal to 100%, the recording error occurs in the same frequency as in the case where the currently outputted recording power is equal to 80% in the above-described first graph 21.

Further, in the second graph 22, when the currently outputted recording power is equal to 110%, occurrence of the recording error decreases. However, the recording error does not largely decrease and, as was expected, the recording error occurs at a frequency to some extent. The above-described fact means the following as shown in the Patent Document 1. That is, in the case where the presumed output value of past radiated laser light is larger than the reference output value (an optimal recording power calculated out by the OPC process), even when laser light is irradiated onto the already recorded area with the output value larger than the reference output value, the recording errors increase and the improvement effect decreases.

As described above, even in the case of the above-described Patent Document 1, since the recording error increases and the improvement effect decreases, as a result, deterioration of the recording quality is incurred. At the same time, when laser light is repeatedly irradiated with the output value larger than the reference output value, a recording film of the optical disc deteriorates.

Figure 3:
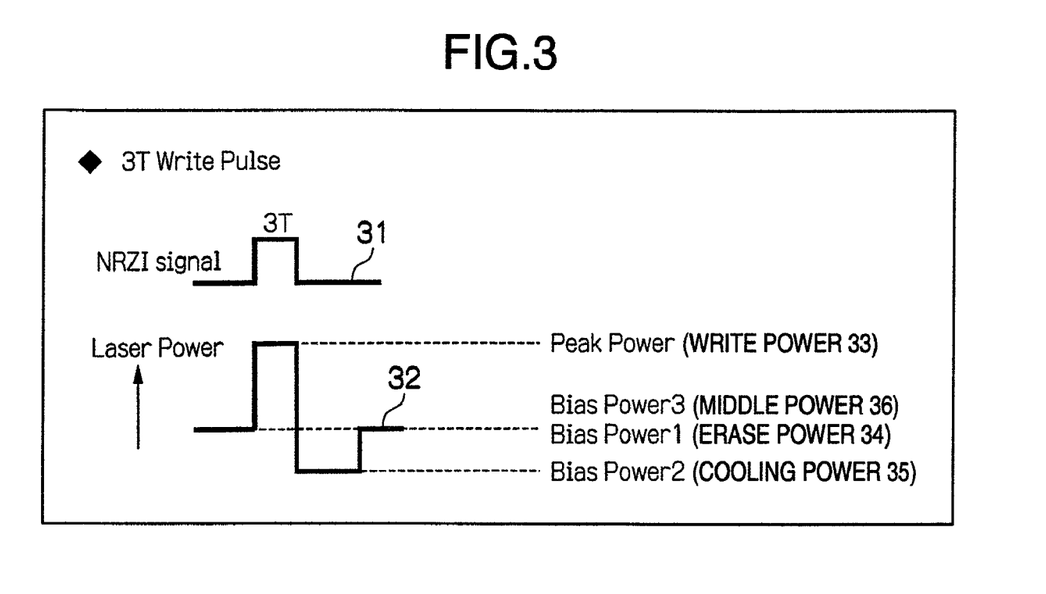
FIG. 3 is a conceptual diagram illustrating one example of a light emitting pattern of mono-pulse.
Figure 4:
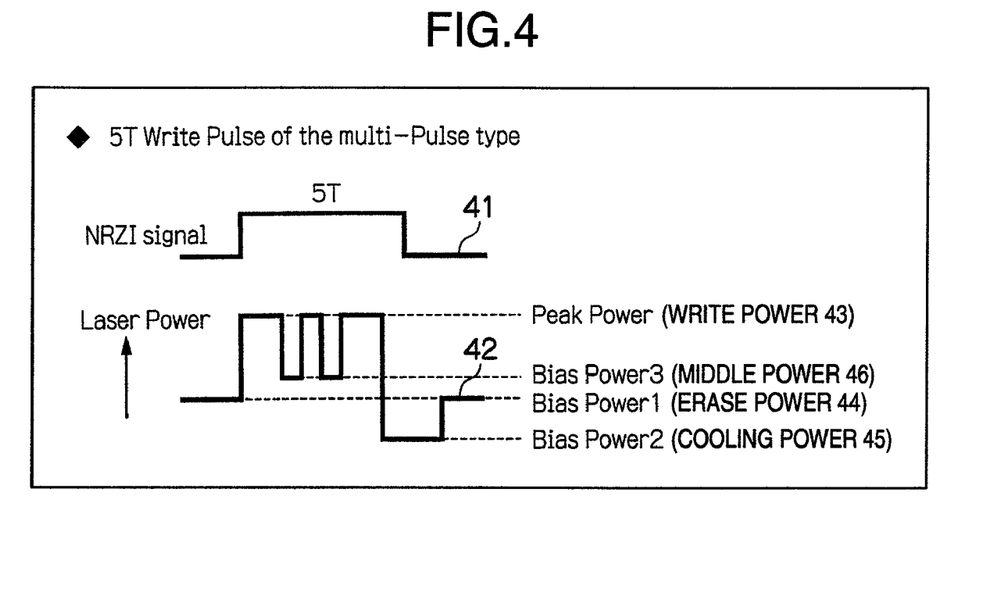
FIG. 4 is a conceptual diagram illustrating one example of a light emitting pattern of multi-pulse.
Figure 5:
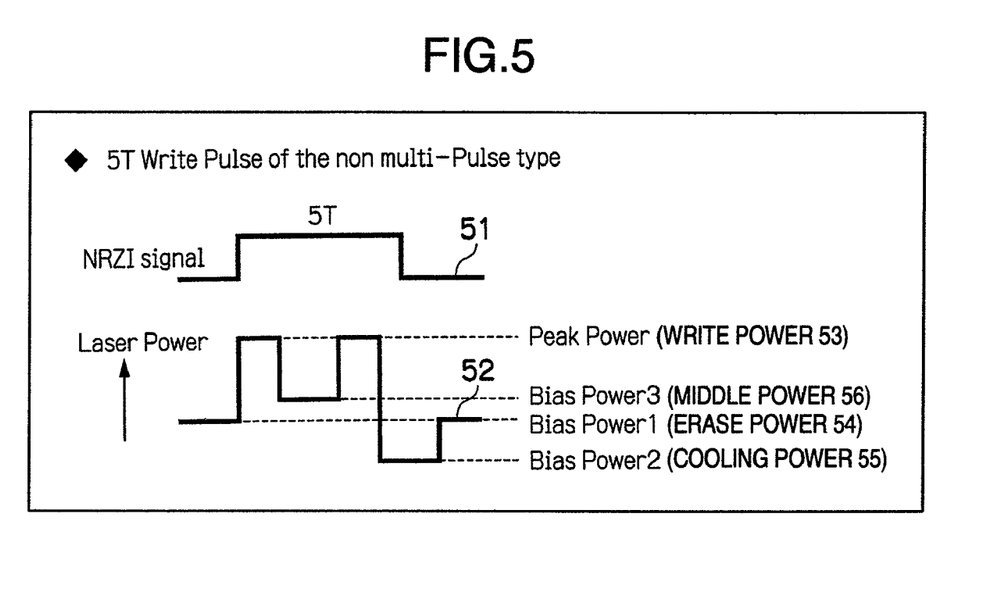
FIG. 5 is a conceptual diagram illustrating one example of a light emitting pattern of non multi-pulse.

FIGS. 3 to 5 illustrate one example of light emitting patterns of the general write pulses on the standard of DVD-RAM. The light emitting patterns of the general write pulses on the standard of DVD-RAM are formed by the control of the output of the recording power of laser beam emitted from the semiconductor laser for the optical pickup 13. In the present embodiment, the light emitting pattern of the write pulse in the DVD-RAM is described as one example; however, the present invention is not limited thereto and can be applied, for example, also to the light emitting pattern of the Write Pulses of the CD-RW, DVD±RW, and BD-Re (Blu-ray Disc Rewritable).

FIG. 3 illustrates one example of the light emitting pattern of a so-called mono-pulse (3T write pulse). A NRZI Signal 31 is formed by the control of the output of a recording light emitting pattern 32 of the laser beam emitted from the semiconductor laser shown in FIG. 3.

In this case, the recording light emitting pattern 32 is constructed by the combination of write power 33 such as peak power as a recording power of the maximum output, erase power 34 such as bias power 1 as a recording power of canceling output, cooling power such as bias power 2 as a recording power of the minimum output, and middle power 36 such as bias power 3 as a recording power of output from a depressed portion of multi-pulse.

Since the recording light emitting pattern 32 of the mono-pulse is a mono-pulse, the erase power 34 and the middle power 36 have the same recording power.

FIG. 4 illustrates one example of the light emitting pattern of a so-called multi-pulse (5T write pulse of the multi-pulse type). A NRZI signal 41 is formed by the control of the output of the recording light emitting pattern 42 of a laser beam emitted from the semiconductor laser shown in FIG. 4. In this case, the recording light emitting pattern 42 is constructed by the combination of the write power 43, erase power 44, cooling power 45, and middle power 46.

FIG. 5 illustrates one example of the light emitting pattern of a so-called non multi-pulse (5T write pulse of the non multi-pulse type). A NRZI signal 51 is formed by the control of the output of the recording light emitting pattern 52 of a laser beam emitted from the semiconductor laser shown in FIG. 5. In this case, the recording light emitting pattern 52 is constructed by the combination of the write power 53, erase power 54, cooling power 55, and middle power 56.

In the present embodiment, with regard to the light emitting pattern of multi-pulses and non multi-pulses, the recording power of the middle power 46 and 56 is normally larger than that of the erase power 44 and 54; however, the present invention is not limited thereto. The recording power of the erase power 44 and 54 may be the same as that of the middle power 46 and 56 and further, the recording power of the middle power 46 and 56 may be smaller than that of the erase power 44 and 54.

Figure 6:
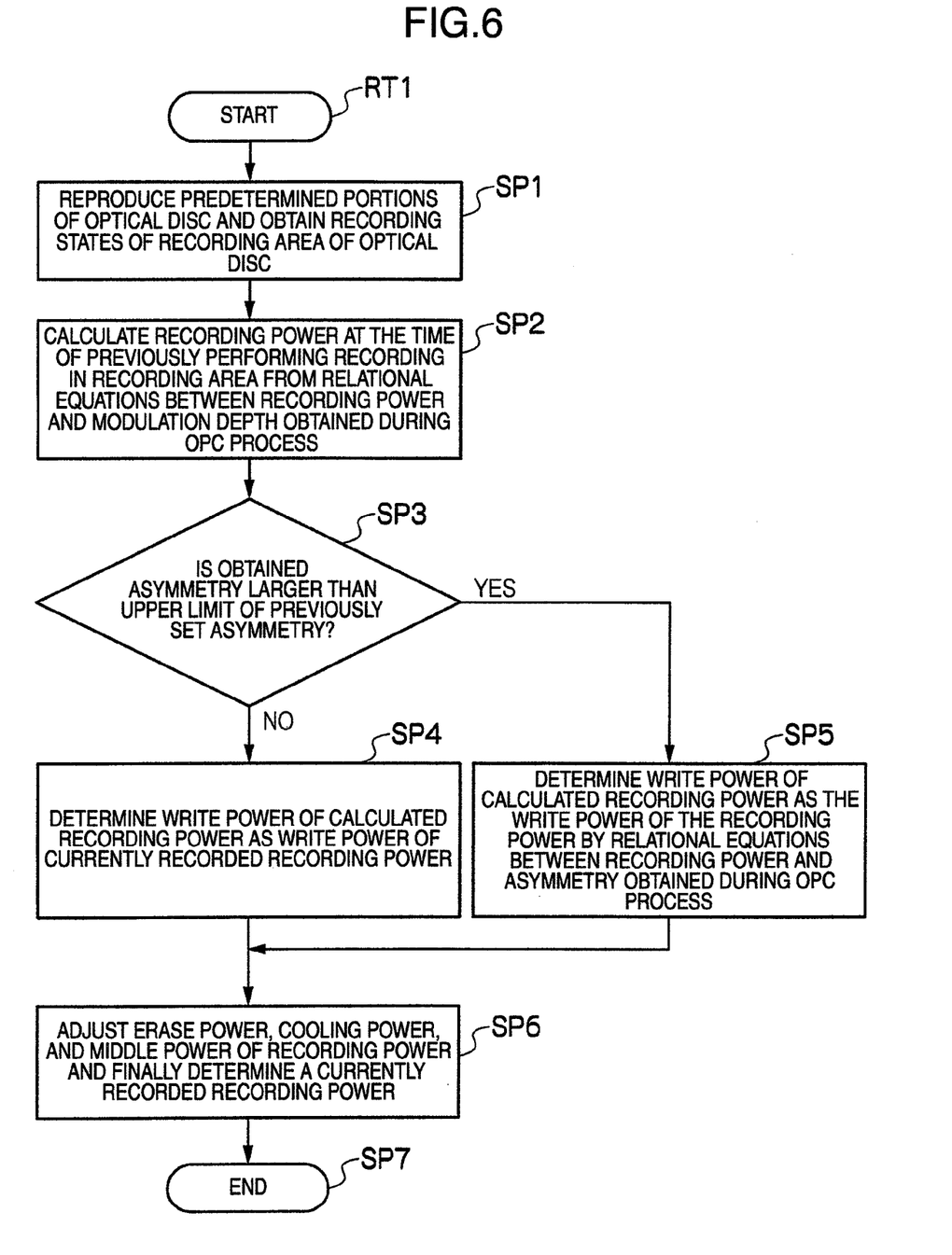
FIG. 6 is a flowchart showing a procedure for determining a recording power.

FIG. 6 is one example of a flowchart showing a specific procedure of the microcomputer 18 for the optical disc apparatus 1 in relation to the process for determining the recording power in this optical disc apparatus 1.

When the optical disc 12 is inserted into the optical disc apparatus and the loading setup of the optical disc 12 is started, for example, the microcomputer 18 executes a control program within the Flash-ROM 19 (not shown in the figure). The microcomputer 18 reproduces predetermined portions of the optical disc 12 and obtains recording states of the recording area of the optical disc 12, according to the procedure RT1 for determining the recording power in shown FIG. 6 (SP1).

In this case, the loading setup is started and, when reproducing a file system of the optical disc 12, the microcomputer 18 gives an instruction to the laser control circuit 15 so as to reproduce several data blocks on the inner periphery side of the optical disc 12. Thereafter, the microcomputer 18 receives from the reproducing circuit 17 RF signals among the reproduced signals based on laser irradiation from the optical pickup 13. Then, the microcomputer 18 calculates and obtains a modulation depth and asymmetry (β) of the RF signal from the received RF signals.

Figure 7:
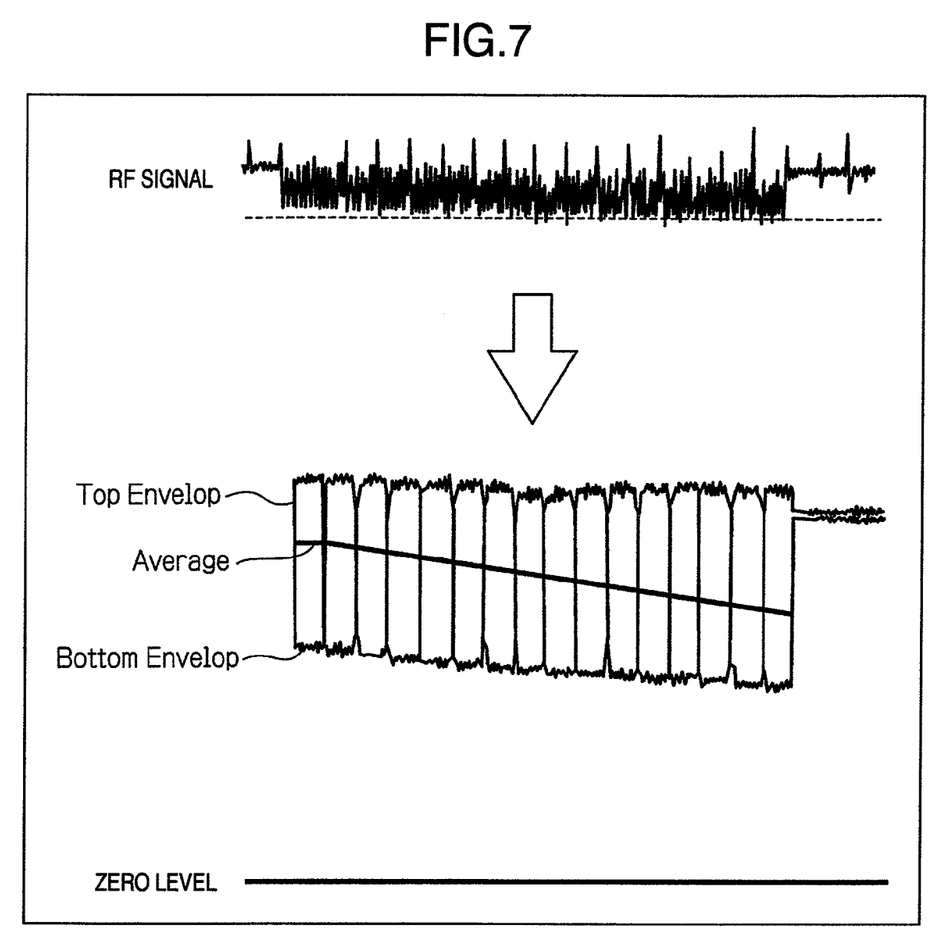
FIG. 7 is a conceptual diagram illustrating one example of waveforms and enlarged waveforms of RF signals.

FIG. 7 illustrates one example of waveforms and enlarged waveforms of RF signals. The modulation depth (M) and asymmetry (β) are calculated out from a top envelope value and bottom envelope value of the RF signals.

Here, assuming that the top envelope value is set to 'T', the bottom envelope value is set to 'B', and an average between the top and bottom envelope values is set to 'A', respectively. In this case, the modulation depth (M) (%) can be calculated out by the following equation.

$$M=(T-B)/T \quad (1)$$

Further, the asymmetry (β) (%) can be calculated out by the following equation.

$$\beta=\{(T+B)-2A\}/T-B \quad (2)$$

In the case where the optical disc 12 is a DVD-RAM disc and the loading setup is started, when reproducing a disc identification zone (DIZ) or defect management area (DMA) of the optical disc 12, the microcomputer 18 gives an instruction to the laser control circuit 15 so as to reproduce several data blocks on the inner periphery and outer periphery sides of the optical disc 12. In this case, the microcomputer 18 receives RF signals from the inner periphery and outer periphery sides of the disc 12, and calculates out and obtains the modulation depth and asymmetry of the RF signals. Therefore, the microcomputer 18 can obtain relational equations between the modulation depth and asymmetry on each of the inner periphery and outer periphery sides. Further, from the relational equations, the microcomputer 18 can calculate out also the modulation depth and asymmetry in a portion between the inner periphery and the outer periphery sides.

Referring again to FIG. 6, the microcomputer 18 continuously calculates out the recording power at the time of being previously recorded in the recording area from the relational equations between the recording power and the modulation depth of the optical disc 12 obtained during the OPC process (SP 2).

In this case, the microcomputer 18 controls the recording power while stepwise increasing it during the OPC process, thereby calculating out the optimum recording power. Therefore, the microcomputer 18 calculates out also the modulation depth and asymmetry of the recording power for every recording power. Accordingly, the microcomputer 18 can obtain through the OPC process the relational equations between the recording power and modulation depth of the optical disc 12 as well as between the recording power and the asymmetry.

Further, when the microcomputer 18 applies the modulation depth obtained in the above-described step SP1 to the relational equations between the recording power and modulation depth obtained during the OPC process, thereby calculating (inferring) the recording power at the time of being previously recorded in the recording area. The microcomputer 18 can calculate out (infer) the recording power at the time of being previously recorded in the recording area through the relational equations between the recording power and modulation depth as well as between the recording power and asymmetry of the optical disc 12 previously registered in each optical disc 12.

Continuously, the microcomputer 18 checks whether the asymmetry obtained in the step SP1 is larger than the upper limit of the asymmetry previously set by the microcomputer 18 for the purpose of preventing the deterioration in the recording film of the optical disc 12 (SP3).

When the obtained asymmetry is equal to or less than the upper limit of the previously set asymmetry (SP3: NO), the microcomputer 18 determines the write power of the recording power calculated out in the above-described step SP2 as the write power of the currently recorded recording power (SP4). On the contrary, when the obtained asymmetry is larger than the upper limit of the previously set asymmetry (SP3: YES), the microcomputer 18 applies the upper limit of the previously set asymmetry to the relational equations between the recording power and asymmetry obtained during the OPC process. Thereby, the microcomputer 18 calculates out the recording power and determines the write power of the recording power as the write power of the currently recorded recording power (SP5).

As described above, when the obtained asymmetry is larger than the previously set asymmetry, the microcomputer 18 determines as the write power of the currently recorded recording power not the write power of the recording power calculated out in the step SP2 but the recording power based on the upper limit of the previously set asymmetry. Therefore, the microcomputer 18 can effectively prevent the recording film of the optical disc 12 from deteriorating due to the output of laser beam with the large recording power.

That is, when the asymmetry increases, the modulation depth also increases. As a result, the previously set asymmetry plays a role in preventing excess output of the recording power onto the optical disc 12.

Continuously, the microcomputer 18 adjusts the erase power, cooling power, and middle power of the calculated recording power and finally determines the currently recorded recording power (SP6).

Figure 8:
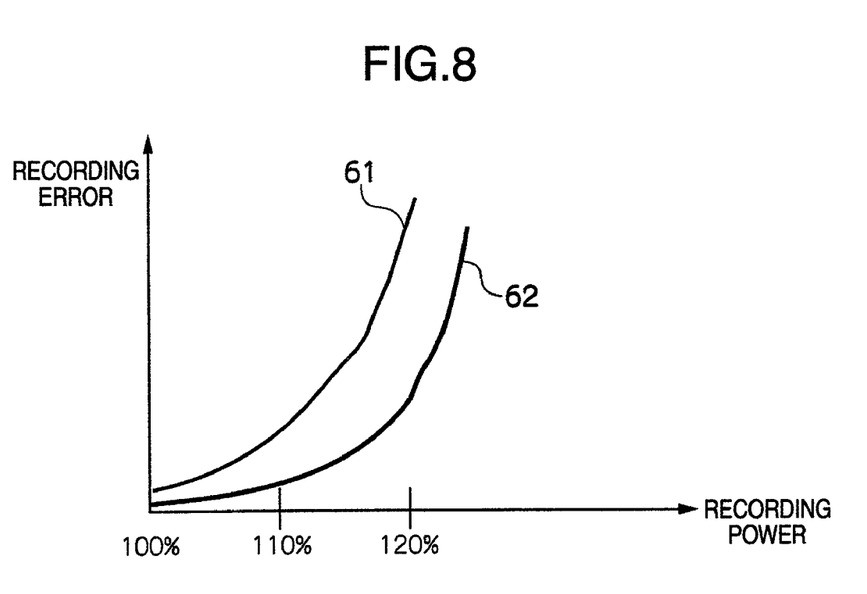
FIG. 8 is a conceptual diagram illustrating one example of a relationship between the currently outputted recording power and the recording error.

FIG. 8 illustrates one example of a relationship between the currently outputted recording power and the recording error. The horizontal axis represents the currently outputted recording power when performing an overwrite operation onto the previously recorded recording area, while the vertical axis represents the frequency of the recording error. In addition, the recording power of 100% in the horizontal axis means that the recording power is currently outputted with the previously outputted recording power. Further, the recording power of 110% means that the recording power is currently outputted with the recording power larger by 10% than the previously outputted recording power.

A third graph 61 shows the case where the write power, erase power, cooling power, and middle power of the currently outputted recording power are outputted with the same level as that of those of the previously outputted recording power. In the third graph 61, although the write power, erase power, cooling power, and middle power of the currently outputted recording power are outputted with the same level as that of those of the previously outputted recording power, as the previously outputted recording power more increases, the frequency of the recording error more increases rapidly. Therefore, even if the overwrite operation is performed with the previously outputted recording power, the recording error increases and the improvement effect decreases.

On the contrary, a fourth graph 62 shows the case where only the write power of the currently outputted recording power is outputted with the same level as that of the write power of the previously outputted recording power, and the erase power, cooling power, and middle power of the currently outputted recording power are adjusted. In the fourth graph 62, even when the previously outputted recording power increases, the frequency of occurrence of the recording error is gently elevated as compared with the above-described third graph 61. Therefore, when performing an overwrite operation, the improvement effect of the recording quality increases.

As described above, the microcomputer 18 adjusts the erase power, cooling power, and middle power of the calculated recording power, and thereby, can reduce the occurrence frequency of the recording error as compared with the case where an overwrite operation is performed with the previously outputted recording power.

Figure 9:
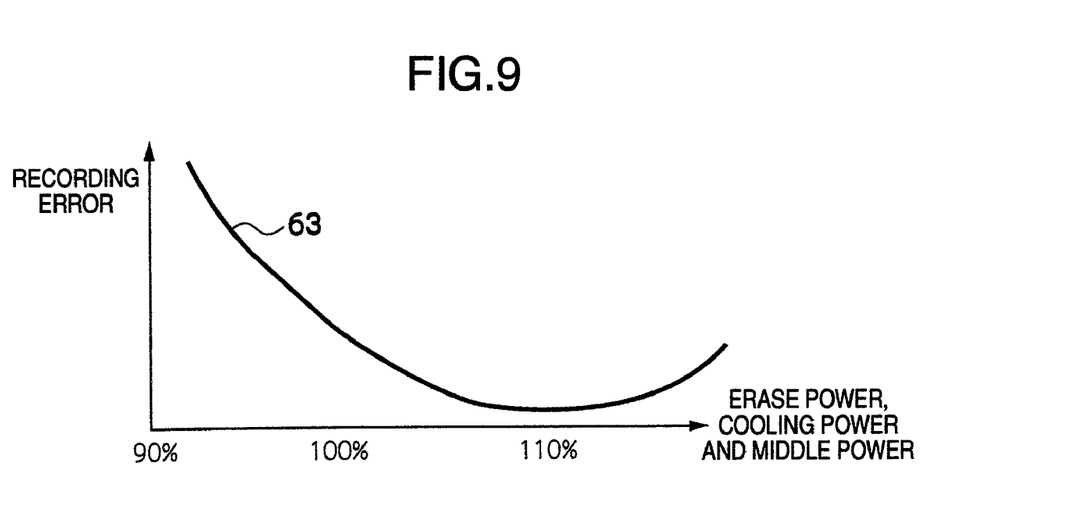
FIG. 9 is a conceptual diagram illustrating one example of a relationship between currently outputted erase power, cooling power, and middle power and the recording error.

FIG. 9 shows one example of a relationship between the currently outputted erase power, cooling power, and middle power, and the recording error. The horizontal axis represents the erase power, cooling power, and middle power of the currently outputted recording power when performing an overwrite operation onto the previously recorded recording area, while the vertical axis represents the frequency of the recording error. In addition, the fact that the erase power, cooling power, and middle power of the recording power in the horizontal axis is outputted with a level of 100% means that the erase power, cooling power, and middle power of the currently outputted recording power is outputted with those of the previously outputted recording power. Further, the fact that the erase power, cooling power, and middle power of the recording power is outputted with a level of 110% means that the erase power, cooling power, and middle power of the recording power is currently outputted with the recording power larger by 10% than those of the previously outputted recording power.

In a fifth graph 63, when the erase power, cooling power, and middle power of the currently outputted recording power is outputted with a level of 110% as compared with those outputted with a level of 100%, the frequency of the recording error is reduced. Therefore, when the erase power, cooling power, and middle power of the currently outputted recording power is increased as compared with the case where an overwrite operation is performed using those of the previously outputted recording power, the recording error decreases and the improvement effect increases.

As described above, the microcomputer 18 finally determines the currently recorded recording power, by increasing the erase power, cooling power, and middle power of the calculated recording power as compared with those of the previously outputted recording power.

By doing so, even when the previously outputted recording power increases, the microcomputer 18 can reduce the recording error without increasing the write power of the recording power. Simultaneously, the microcomputer 18 can effectively prevent the recording film of the optical disc 12 from deteriorating due to the output of laser beam with the larger recording power.

Thereinafter, the microcomputer 18 finishes the procedure RT1 for determining the recording power shown in the above-described FIG. 6 (SP7).

In the present embodiment, the case where the erase power, cooling power, and middle power of the calculated recording power are increased without variation is described; however, the present invention is not limited thereto. Any one or any two of the erase power, cooling power, and middle power may be increased. By doing so, the microcomputer 18 can adjust the erase power, cooling power, and middle power more finely, and further reduce the recording error through the adjustment.

In the present embodiment, the case where the loading setup of the optical disc 12 is started and when reproducing the file system of the optical disc 12, the microcomputer 18 performs the procedure RT1 for determining the recording power shown in FIG. 6 is described; however, the present invention is not limited thereto. For example, during the recording (when the recording in the optical disc 12 is started) when processing actual recording signals inputted from the outside to perform the recording control and also in various opportunities, the microcomputer 18 may perform the procedure RT1 for determining the recording power shown in FIG. 6. In this case, as examples, when reproducing a read modify write (RMW) during the recording, or reproducing several data blocks at the head of the optical disc in the switching of zone during the recording, or reproducing data of the last recording address obtained from the file system after the loading of the optical disc 12, whereby the microcomputer 18 performs the procedure RT1 for determining the recording power shown in FIG. 6.

As described above, not only during the loading of the optical disc 12 but also during the recording thereof, the microcomputer 18 performs the procedure RT1 for determining the recording power shown in FIG. 6, and thereby, can improve the recording quality in performing an overwrite operation in various opportunities such as in the loading, in the recording and so on.

Further, in the present embodiment, the description is made as follows. That is, the recording power at the time of previously performing recording in the recording area is calculated out. When the calculated recording power is equal to or less than the upper limit of the previously set asymmetry, the write power of the recording power calculated out in the above-described step SP2 is determined as the write power of the currently recorded recording power. The case where the erase power, cooling power, and middle power of the calculated recording power are adjusted to finally determine the currently recorded recording power is described; however, the present invention is not limited thereto. The microcomputer 18 performs recording once in a predetermined portion of the optical disc 12 using the calculated recording power at the time of previously performing recording in the recording area, and thereon, performs an overwrite operation. Thereby, the microcomputer 18 may adjust the erase power, cooling power, and middle power to finally determine the currently recorded recording power.

In the case where the optical disc 12 is, for example, a DVD-RAM disc, the microcomputer 18 performs a PwPe scan that alternately outputs the write power (Pw) and the erase power (Pe) at a constant ratio and thereby, calculates out the recording power at the time of previously performing recording in the recording area from relationships between the modulation depth and the asymmetry. Thereafter, the microcomputer 18 performs recording as a base once in a predetermined portion of a test area of the optical disc using the calculated recording power at the time of previously performing recording in the recording area. Then, the microcomputer 18 performs thereon a Pe scan that outputs the erase power, and thereby, calculates out the erase power, cooling power, and middle power to adjust them. At the same time, the microcomputer 18 determines the erase power, cooling power, and middle power in the same manner as in the write power of the recording power at the time of previously performing recording in the recording area to finally determine the currently recorded recording power.

By doing so, the microcomputer 18 determines without variation an increasing rate of the erase power, cooling power, and middle power of the calculated recording power at the time of previously performing recording in the recording area. Thereby, even when the microcomputer 18 cannot necessarily determine the optimum recording power for the optical disc 12, it performs recording once as a base of the recording area using the calculated recording power at the time of previously performing recording in the recording area. Further, the microcomputer 18 performs an overwrite operation thereon and adjusts the erase power, cooling power, and middle power of the recording power, thereby determining the optimum recording power for the optical disc 12.

In the present invention, the microcomputer 18 performs the PwPe scan, Pe scan, and Pw scan, and thereby, calculates out the recording power at the time of currently performing recording in the recording area. Then, the microcomputer 18 calculates out the recording power at the time of previously performing recording in the recording area based on the calculated recording power at the time of currently performing recording in the recording area. Thereafter, the microcomputer 18 performs recording once in a predetermined portion of the optical disc 12 using the calculated recording power at the time of previously performing recording in the recording area. Further, the microcomputer 18 performs an overwrite operation thereon and adjusts the erase power, cooling power, and middle power, and thereby, may finally determine the currently recorded recording power.

In the present invention, the microcomputer 18 performs the PwPe scan, and thereby, calculates out the recording power at the time of previously performing recording in the recording area. Further, the microcomputer 18 performs recording once in a predetermined portion of the optical disc 12 using the calculated recording power at the time of previously performing recording in the recording area. Thereafter, the microcomputer 18 may perform the Pe scan thereon, and thereby, calculate out the erase power, cooling power, and middle power to adjust them. At the same time, the microcomputer 18 may determine the erase power, cooling power, and middle power in the same manner as in the write power of the recording power at the time of previously performing recording in the recording area to finally determine the currently recorded recording power.

(2) Operation and Effect

As described above, in the optical disc apparatus 1, the microcomputer 18 calculates out the recording power at the time of previously performing recording in the recording area, determines the write power of the calculated recording power as the write power of the recording power at the time of currently performing recording in the recording area, adjusts the erase power, cooling power, and middle power of the calculated recording power, and determines finally the currently recorded recording power.

Accordingly, even when the previously outputted recording power increases, the microcomputer 18 can reduce the recording error without increasing the write power of the recording power. At the same time, the microcomputer 18 can effectively prevent the recording film of the optical disc 12 from deteriorating due to the output of larger recording power. As a result, the microcomputer 18 can improve the overwrite performance.

The present invention can be widely applied to an optical disc apparatus incorporated into a personal computer such as a host computer.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

The invention claimed is:

1. An optical disc apparatus which performs an overwrite operation on a re-writable type optical disc, the optical disc apparatus comprising:
   a calculating module which calculates out a recording power at the time of previously performing recording in a recording area of the re-writable type optical disc; and
   a recording power determining module which determines a write power of the recording power calculated out by the calculating module as a write power at the time of currently performing recording in the recording area of the re-writable type optical disc, and at the same time, adjusts at least one of erase power, cooling power, or middle power of the recording power calculated out by the calculating module to finally determine the currently recorded recording power for performing an overwrite operation on the re-writable type optical disc.

2. The optical disc apparatus, as described in the claim 1, wherein:
   the calculating module calculates out from inputted reproduction signals a modulation depth and asymmetry of the reproduction signal and calculates out a recording power at the time of previously performing recording in the recording area of the optical disc based on the calculated modulation depth.

3. The optical disc apparatus, as described in the claim 2, wherein:
   the recording power determining module, when the asymmetry calculated out by the calculating module is equal to or less than an upper limit of a previously set asymmetry, determines a write power of the recording power calculated out by the calculating module as a write power of the currently recorded recording power.

4. The optical disc apparatus, as described in the claim 2, wherein:
   the recording power determining module, when the asymmetry calculated out by the calculating module is larger than an upper limit of the previously set asymmetry, calculates out the recording power based on the upper limit of a previously set asymmetry and determines the write power of the recording power as the write power of the currently recorded recording power.

5. The optical disc apparatus, as described in the claim 1, wherein:
   the recording power determining module increases at least one of the erase power, cooling power, or middle power of the recording power calculated out by the calculating module to finally determine the currently recorded recording power.

6. The optical disc apparatus, as described in the claim 5, wherein:
   the recording power determining module increases any one or any two of the erase power, cooling power, and middle power of the recording power calculated out by the calculating module to finally determine the currently recorded recording power.

7. The optical disc apparatus, as described in the claim 1, wherein:
   the calculating module, during loading setup of the optical disc, or when finishing the loading setup, or when starting the recording in the optical disc, calculates out the recording power at the time of previously performing recording in the recording area of the optical disc.

8. The optical disc apparatus, as described in the claim 1, further comprising:
   a recording module which performs recording in the optical disc once by the recording power calculated out by the calculating module and thereon, performs recording in the optical disc by the currently recorded recording power determined by the recording power determining module.

9. A method of controlling an overwrite power of an optical disc apparatus which performs an overwrite operation on a re-writable type optical disc, the method comprising:
   a first step for calculating out a recording power at the time of previously performing recording in a recording area of the re-writable optical disc; and
   a second step for determining a write power of the recording power calculated out in the first step as a write power at the time of currently performing recording in the recording area of the re-writable type optical disc, and at the same time, for adjusting at least one of erase power, cooling power, or middle power of the recording power calculated out in the first step to finally determine the currently recorded recording power for performing an overwrite operation on the re-writable type optical disc.

10. The method of controlling an overwrite power of an optical disc apparatus, as described in the claim 9, wherein:
    in the first step,
    from inputted reproduction signals, a modulation depth and asymmetry of the reproduction signal are calculated out; and
    the recording power at the time of previously performing recording in the recording area of the optical disc is calculated out based on the calculated modulation depth.

11. The method of controlling an overwrite power of an optical disc apparatus, as described in the claim 10, wherein:
    in the second step, when the asymmetry calculated out in the first step is equal to or less than an upper limit of a previously set asymmetry, a write power of the recording power calculated out in the first step is determined as a write power of the currently recorded recording power.

12. The method of controlling an overwrite power of an optical disc apparatus, as described in the claim 10, wherein:
    in the second step, when the asymmetry calculated out in the first step is larger than the upper limit of a previously set asymmetry, the recording power is calculated out based on an upper limit of the previously set asymmetry and a write power of the calculated recording power is determined as the write power of the currently recorded recording power.

13. The method of controlling an overwrite power of an optical disc apparatus, as described in the claim 9, wherein:
    in the second step, at least one of the erase power, cooling power, or middle power of the recording power calculated out in the first step is increased to finally determine the currently recorded recording power.

14. The method of controlling an overwrite power of an optical disc apparatus, as described in the claim 13, wherein:
    in the second step, any one or any two of the erase power, cooling power, and middle power of the recording power calculated out in the first step are increased to finally determine the currently recorded recording power.

15. The method of controlling an overwrite power of an optical disc apparatus, as described in the claim 9, wherein:
    in the first step, during loading setup of the optical disc, or when finishing the loading setup, or when starting the recording in the optical disc, the recording power at the time of previously performing recording in the recording area of the optical disc is calculated out.

16. The method of controlling an overwrite power of an optical disc apparatus, as described in the claim 9, further comprising:
    a third step for performing recording in the optical disc once by the recording power calculated out in the first step and thereon, for performing recording in the optical disc by the currently recorded recording power determined in the second step.

* * * * *